No. 749,329. PATENTED JAN. 12, 1904.
H. SAWYER.
COMBINED CONTROLLER AND BRAKE OPERATING MECHANISM.
APPLICATION FILED SEPT. 1, 1903.
NO MODEL. 3 SHEETS—SHEET 1.
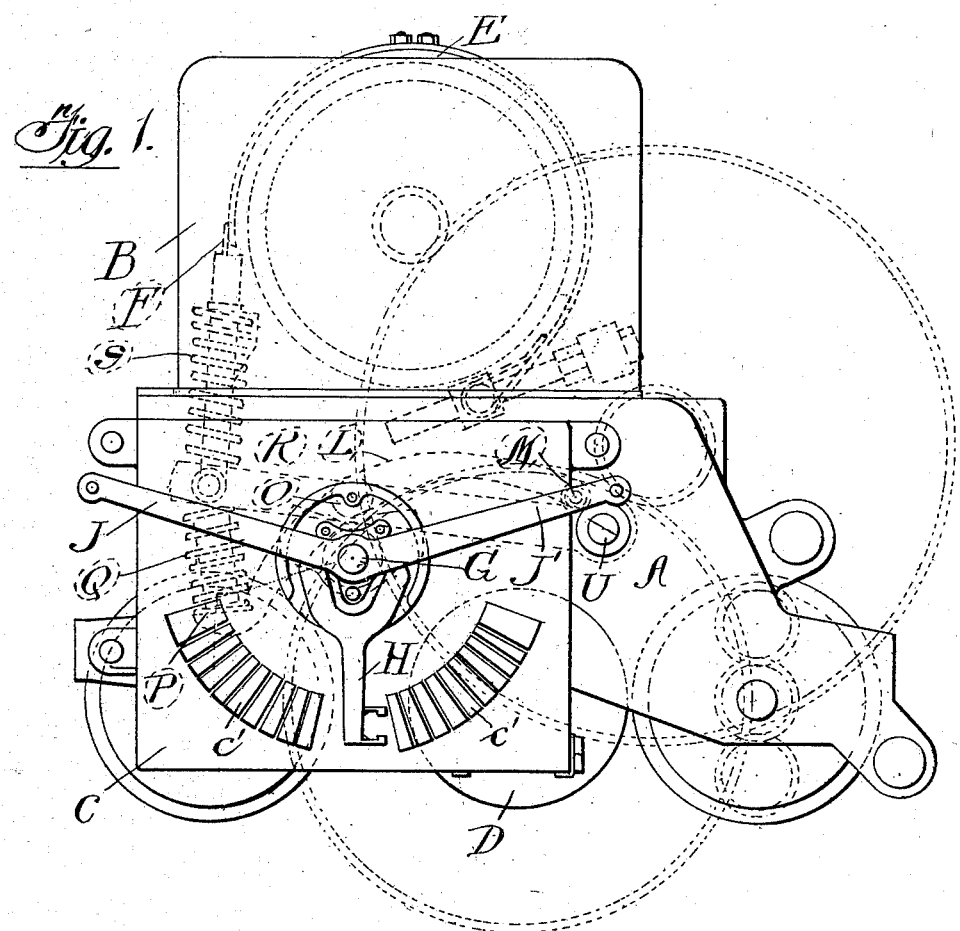
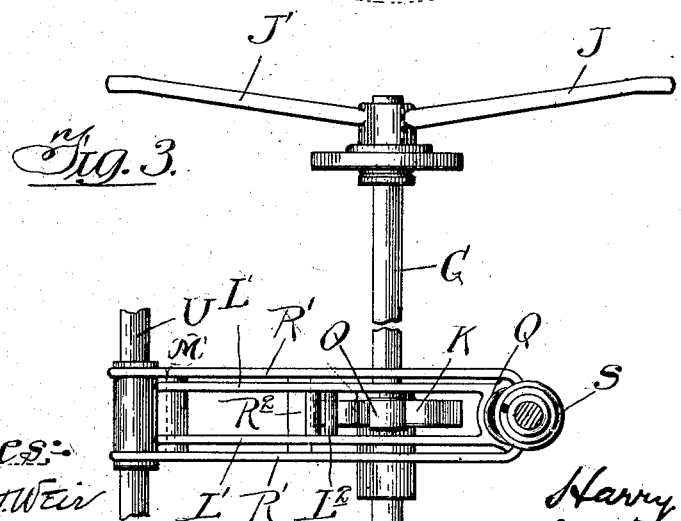

No. 749,329. PATENTED JAN. 12, 1904.
H. SAWYER.
COMBINED CONTROLLER AND BRAKE OPERATING MECHANISM.
APPLICATION FILED SEPT. 1, 1903.
NO MODEL. 3 SHEETS—SHEET 2.

Witnesses
Inventor
Harry Sawyer
By Brown & Darby
Attys

No. 749,329. PATENTED JAN. 12, 1904.
H. SAWYER.
COMBINED CONTROLLER AND BRAKE OPERATING MECHANISM.
APPLICATION FILED SEPT. 1, 1903.

NO MODEL. 3 SHEETS—SHEET 3.

Witnesses:
Robert H. Weir
Edward A. Eisfeldt

Inventor:
Harry Sawyer
By Brown & Darby
Attys

No. 749,329. Patented January 12, 1904.

UNITED STATES PATENT OFFICE.

HARRY SAWYER, OF MUSKEGON, MICHIGAN.

COMBINED CONTROLLER AND BRAKE-OPERATING MECHANISM.

SPECIFICATION forming part of Letters Patent No. 749,329, dated January 12, 1904.

Application filed September 1, 1903. Serial No. 171,568. (No model.)

*To all whom it may concern:*

Be it known that I, HARRY SAWYER, a citizen of the United States, residing at Muskegon, in the county of Muskegon and State of Michigan, have invented a new and useful Combined Controller and Brake-Operating Mechanism, of which the following is a specification.

This invention relates to combined controller and brake-operating mechanism.

The object of the invention is to provide a device of the above character which shall be simple in construction, light in weight, efficient in operation, and economical of manufacture.

A further object of the invention is to provide a construction of the above character in which a brake is automatically applied to the motive power upon the cutting off of the motive force.

A further object of the invention is to provide a brake which shall be applied with gradually-increasing or gradually-decreasing pressure, according as the motive force is varied.

Other objects of the invention will appear more fully hereinafter.

My invention consists, substantially, in the construction, combination, location, and arrangement of parts, all as will be more fully hereinafter set forth, as shown in the accompanying drawings, and finally pointed out in the appended claims.

Figure 2:
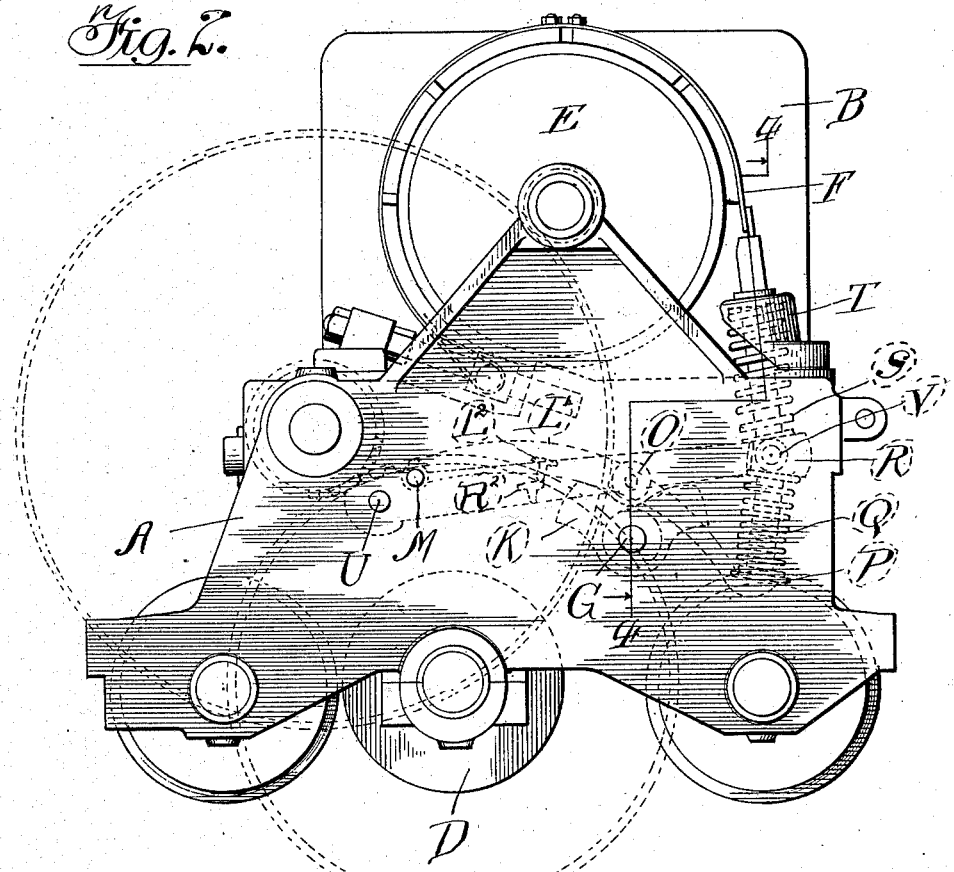
Figure 4:
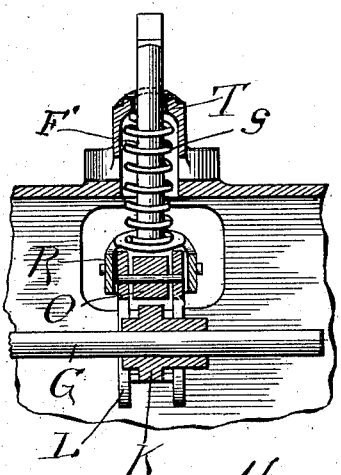
Figure 5:
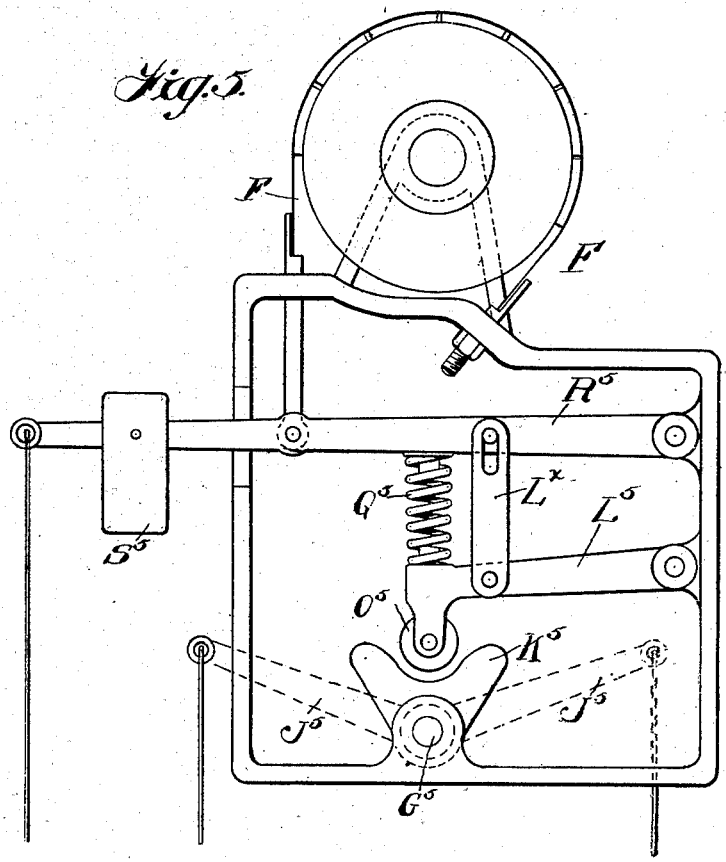
Figure 6:
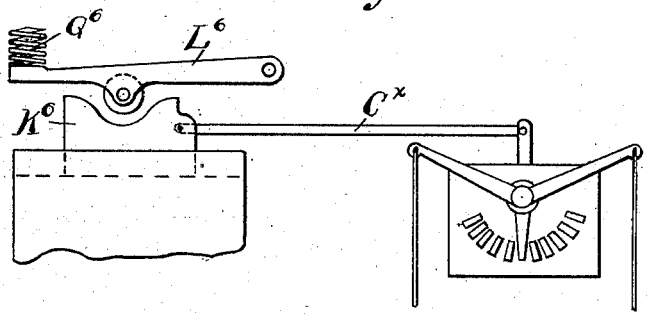

Referring to the accompanying drawings and to the various views and reference-signs appearing thereon, Figure 1 is a view in side elevation showing a crane-hoist or trolley embodying the principles of my invention. Fig. 2 is a similar view looking from the opposite side. Fig. 3 is a detail top plan view showing the controller-shaft and the brake mechanism of Figs. 1 and 2. Fig. 4 is a detail sectional view on the broken line 4 4 of Fig. 2 looking in the direction of the arrows. Fig. 5 is a sectional view showing a slightly-modified form of my brake mechanism. Fig. 6 is a detail view illustrating another modification.

The same part is designated by the same reference-sign wherever it occurs throughout the several views.

In the use of crane-hoists or trolleys it is customary to embody a brake in connection with the hoisting mechanism whereby the load may be supported when the motive force is cut off. In order that the brake may be applied promptly and certainly, it is desirable that the application be automatic—that is to say, so arranged as to be applied by the very action of cutting off the motive force whenever the hoisting mechanism is desired to be stopped. Inasmuch, however, as the power is applied in widely-varying amounts for the different loads and, furthermore, is generally turned off and on gradually, it is desirable to have the brake applied or released by correspondingly-varying degrees rather than applied or removed suddenly. If the brake is released suddenly when the power is turned on gradually, the load is liable to descend by its own weight before the power is sufficient to hoist it, and if the motor is reversed to lower a load the brake must not be wholly released, since its resistance is necessary to balance the combined force of the motor and load. In addition to this the construction should be simple and light in weight in order that the trolley may not impose too great a strain upon its trolley-beam.

Referring to the accompanying drawings, reference-sign A designates the frame of an ordinary trolley-hoist, having an electric or other motor B and a controller C. D designates the hoisting-drum proper, driven by the usual train of gear-wheels from the motor-shaft, as indicated by dotted lines in Figs. 1 and 2. E designates a drum upon the motor or other shaft, having applied thereto the brake-strap F. All these parts may be of the usual or any ordinary construction and form no part of the present invention.

G designates the shaft upon which the controller-arm H is secured. The controller-arm H may be arranged to swing in either direction to the right or left of a center line over a series of contact-segments C' on the controller C, which are designed to control the resistance in the motor-circuit, whereby an electric current may be gradually supplied to or removed from the circuit of motor B to operate the same in the desired direction and with the desired power. The particular form of controller employed, however, is immaterial for the purposes of my invention, and any controlling means for the motive power may be substituted and operated by the controller-shaft G.

I use the term "controller-shaft" to apply to the rotary support for the controller-arm. This shaft may be journaled in bearings in the controller-box or sleeved upon a stud therein or supported in other ways. It may or may not extend through the inclosing walls of the box. It is preferably operated manually or otherwise in any convenient manner—as, for instance, by arms J J', having an eye at the outer end of each, to which depending chains are secured for the purpose of operating said shaft, as indicated in Fig. 5. To this controller-shaft I apply operative connections with the brake mechanism. These connections may be of any desired form. I have shown a preferred construction in which K designates a cam mounted upon the shaft G or an extension thereof. L denotes an arm or lever pivoted at M and carrying a roller O, which coöperates with the cam K, as best illustrated in Fig. 2. The lever L is shown as bent or deflected downwardly and at its outer extremity provided with an enlarged portion forming a supporting bearing-surface P. Q designates a spring supported on said bearing-surface P and bearing at its upper portion against a movable member R, to which the end of the brake-strap F is attached through a rod F', which is arranged to operate through the part T of the frame. S designates another spring also bearing against the movable member R and opposed in its action to the spring Q. The spring S is supported at its upper end against a fixed abutment T on the main frame. The movable member R is shown in the form of an arm or lever pivoted in the main frame at U. The levers R and L may each be pivoted in any desired way. They may both be pivoted to the frame at separate points or concentrically, or one may be pivoted to the other, if desired. If both are pivoted to the main frame, it is preferable that the pivot-points be located in substantial proximity to one another. The movable member R may of course be formed and guided to move in any desired manner. V designates a pivot-pin connecting the end of the brake-strap with the movable member R.

Both the arms or levers L and R are shown comprising parallel strips or plates R' and L', suitably braced at $L^2$ and $R^2$ and symmetrically disposed with respect to the central plane of movement of the parts. In this way the strains of the parts are balanced and the effective forces all directed in their central plane of movement. The pivotal points of the levers may lie in any way—as, for example, in such a way that the levers extend in crossed relation. By this means are secured a more convenient disposition of the parts and a more advantageous application of the effective forces. I provide means by which the expansive movement of the spring Q is limited. For this purpose an internal limiting-bolt may be employed or the brace-bars $L^2$ and $R^2$ may be disposed to contact with one another, as clearly shown in Fig. 2.

The operation of this device will be understood from the preceding description. When the controller-arm is at its neutral position, the roller O lies at a low part of the cam K and not resting upon it. $L^2$ rests upon $R^2$, resisting the expansion of spring Q. Spring S carries levers L and R down until the brake is applied. At this time the lever L is at its lowermost position and the spring Q expanded to its limit of movement. In practice I arrange the stops $L^2 R^2$ in such a way that they contact before the roller O reaches the low part of the cam K, and accordingly at this time the entire pressure of the spring Q is taken up by said stops. The expansive force of the spring S is accordingly unbalanced and is exerted to depress the arm R and apply the brake-strap, whereby the hoisting mechanism is fixed against movement. If now the controller-shaft is swung to one side or the other—say, for example, for the purpose of lowering a load—the roller O is raised by the cam K, compressing the spring Q and rendering its expansive force effective to partially counterbalance the spring S and remove a part of the tension of the latter from the brake-strap to the extent thereof. As the controller-arm is swung farther and farther the spring Q is more and more compressed and a corresponding tension removed from the brake-strap, until finally a point is reached when the combined weight of the load and the increased torque of the motor overcome the decreased resistance of the brake and the load is lowered. If the resistance of the brake were removed suddenly when power is applied gradually or perhaps in a direction corresponding to the pull of the load, the latter would be liable to drop suddenly at a dangerous speed, which objection is avoided by the construction above described.

In hoisting the brake is not completely relieved until the movement of the controller is sufficient to give the power necessary to hoist the load. If the brake were suddenly relieved, as would be the case if the spring Q were not used, the load might be allowed to descend before the power were sufficient to hoist it.

While I have shown this invention applied to a form of traveling crane and trolley-hoist, it is obvious that it may be applied to any form of hoisting or other mechanism in which a brake is used. I do not, therefore, desire to be limited or restricted to its use with any one form of mechanism.

It is obvious that many different ways may suggest themselves to persons skilled in the art by which the brake-applying spring can be gradually counterbalanced or its tension varied in a gradually increasing and decreasing manner. For example, I may employ a construction of the form shown in Fig. 5, wherein $G^5$ designates the controller-shaft or a shaft moving therewith, and $J^5 J^5$ operating-arms, through which said shaft may be rotated manually or otherwise. $K^5$ denotes a cam upon the shaft $G^5$, and $L^5$ an arm carrying roller $O^5$, coöperating therewith. $R^5$ denotes an arm connected to the brake-strap F and which, as also in the case of lever R, above referred to, may, if desired, be manually operated when necessary, as by means of a cable or other connections at the end thereof, as shown. $S^5$ denotes an adjustable weight upon the arm $R^5$ for normally applying tension to the brake-strap. $Q^5$ denotes the spring corresponding to the spring Q in the previously-described form. In order to limit the expansive movement of the spring $Q^5$, I may employ a slotted link $L^\times$, connecting the levers $L^5 R^5$. In like manner the construction may be modified, as shown in Fig. 6, in which the cam $K^6$ instead of rotating with the controller-shaft is of a form to reciprocate in guides. A connecting-rod $C^\times$ may be employed to connect the cam $K^6$ with the controller-shaft. The cam $K^6$ coöperates with an arm $L^6$ and spring $Q^6$ in the same manner as above described. Other modifications will readily suggest themselves to persons skilled in the art. I do not, therefore, desire to be limited or restricted to the exact details shown and described; but, Having now set forth the object and nature of my invention and a construction embodying the principles thereof, what I claim as new and useful and of my own invention, and desire to secure by Letters Patent, is—

1. In a controlling mechanism for a hoisting device, the combination with a controller-shaft for the motive power, of a brake apparatus coöperating with the hoisting device, a spring for exerting a tension on such brake apparatus, and means operated by said controller-shaft for varying the amount of such tension, as and for the purpose set forth.

2. In a controlling mechanism for a hoisting device, the combination with a controller for the motive power, of a brake apparatus coöperating with the hoisting device, a spring for exerting a tension on such brake apparatus, and mechanical connections operated by said controller for varying the amount of such tension, as and for the purpose set forth.

3. In a controlling mechanism for a hoisting device, the combination with a controller-shaft for the motive power, of a brake apparatus coöperating with the hoisting device, means for exerting a tension on such brake apparatus, and mechanism connected with the controller-shaft for gradually varying such tension to correspond with the gradual movement of said shaft, as and for the purpose set forth.

4. In a controlling mechanism for a hoisting device, the combination with a controller for the motive power, of a brake coöperating with the hoisting device, means for applying pressure to said brake comprising a spring and mechanical connections from said controller formed and arranged to apply a gradually-varying tension thereto as the controller is operated, as and for the purpose set forth.

5. In a controlling mechanism for a hoisting device, the combination with a controller for the motive power, and operating mechanism therefor, of a brake coöperating with the hoisting device, expansive means for applying said brake, and other counterbalancing expansive means therefor, mechanically operated by the controller-operating mechanism, as and for the purpose set forth.

6. In a controlling mechanism for a hoisting device, the combination with a manually-operated controller for the motive power, of a brake coöperating with the hoisting device, means for supplying a pressure to said brake, and means mechanically operated from the controller for gradually counterbalancing the pressure on said brake, as and for the purpose set forth.

7. In a controlling mechanism for a hoisting device, the combination with a controller-shaft for the motive power, of a brake coöperating with the hoisting device, and means for applying a pressure thereto, a cam moving with the controller-shaft, and means controlled thereby for gradually varying the brake-applying pressure, as and for the purpose set forth.

8. In a controlling mechanism for a hoisting device, the combination with a manually-operated controller-shaft for the motive power, of a brake coöperating with the hoisting device, and means for applying a pressure thereto, a pivoted arm, a cam moving with the controller-shaft and coöperating with said pivoted arm, a spring attached to said pivoted arm and coöperating with the brake-pressure means to vary the tension of the brake, as and for the purpose set forth.

9. In a controlling mechanism for a hoisting device, the combination with a controller for the motive power, of a brake coöperating with the hoisting device, and means for applying a pressure thereto, a pivoted arm, a cam coöperating with said pivoted arm for gradually varying the pressure of said brake, and an additional pivoted arm with which said first-mentioned arm coöperates in applying the brake, as and for the purpose set forth.

10. In a controlling mechanism for a hoisting device, the combination with the controller-shaft for the motive power, of a brake coöperating with the hoisting device, and a spring for applying a pressure thereto, a pivoted arm, a cam actuated by the controller-shaft and coöperating with said pivoted arm, and pressure means applied by said arm for counterbalancing said spring, as and for the purpose set forth.

11. In a controlling mechanism for a hoisting device, the combination with a manually-operated controller for the motive power, of a brake coöperating with the hoisting device, and a spring supported against a fixed abutment for applying a pressure thereto, a cam, a movable arm coöperating with said cam, and a second spring interposed between said arm and the brake, as and for the purpose set forth.

12. In a controlling mechanism for a hoisting device, the combination with a manually-operated controller-shaft for the motive power, of a brake coöperating with the hoisting device, and a spring supported against a fixed abutment for applying a pressure thereto, a cam actuated by the controller-shaft, a movable arm coöperating with said cam, a second movable arm connected with the brake, and a second spring interposed between said arms, as and for the purpose set forth.

13. In a controlling mechanism for a hoisting device, the combination with a manually-operated controller-shaft for the motive power, of a brake coöperating with the hoisting device, and a spring supported against a fixed abutment for applying a pressure thereto, a cam actuated by the controller-shaft, a movable arm coöperating with said cam, a second movable arm connected with the brake and a second spring interposed between said arms, as and for the purpose set forth.

14. In a controlling mechanism for a hoisting device, the combination with a controller-shaft for the motive power, of a brake coöperating with the hoisting device, an operating-rod for said brake extending through a fixed member on the frame, a plurality of movable members operated by said controller-shaft and connected with said rod, and springs interposed between each of said members, as and for the purpose set forth.

15. In a controlling mechanism for a hoisting device, the combination with a controller-shaft for the motive power, of a brake coöperating with the hoisting device, an operating-rod for said brake extending through a fixed member on the frame, a plurality of movable members operated by said controller-shaft, each comprising pivoted arms mutually crossing the respective lines of movement of each other, and springs interposed between said members, as and for the purpose set forth.

16. In a controlling mechanism for a hoisting device, the combination with a controller-shaft for the motive power, of a brake coöperating with the hoisting device, an operating-rod for said brake extending through a fixed abutment on the frame, a plurality of movable pivoted arms operated by said controller-shaft, each comprising a pair of connected side plates, and springs interposed between said arms, and between the upper arm and the fixed abutment, as and for the purpose set forth.

In witness whereof I have hereunto set my hand, this 28th day of August, 1903, in the presence of the subscribing witnesses.

HARRY SAWYER.

Witnesses:
C. H. SEEM,
S. E. DARBY.